(12) United States Patent
Jain et al.

(10) Patent No.: US 7,447,649 B2
(45) Date of Patent: Nov. 4, 2008

(54) SYSTEM, METHOD, AND COMPUTER READABLE MEDIUM FOR IMPLEMENTING A MEDIA CONTENT STORE

(75) Inventors: Vikramaditya Jain, Santa Monica, CA (US); Kale McNaney, Santa Monica, CA (US); Temitope Sonuyi, Placentia, CA (US); Sudhin Shahani, Santa Monica, CA (US); Joshua Zibit, Pacific Palisades, CA (US)

(73) Assignee: Musicane Corporation, Venice, CA (US)

( * ) Notice: Subject to any disclaimer, the term of this patent is extended or adjusted under 35 U.S.C. 154(b) by 0 days.

(21) Appl. No.: 11/777,024

(22) Filed: Jul. 12, 2007

(65) Prior Publication Data

US 2007/0250598 A1    Oct. 25, 2007

Related U.S. Application Data

(63) Continuation of application No. 11/327,154, filed on Jan. 6, 2006.

(51) Int. Cl.
*G06Q 30/00* (2006.01)
*G06F 17/30* (2006.01)

(52) U.S. Cl. .......................................... 705/26; 705/27
(58) Field of Classification Search ................... 705/1, 705/26–27, 52–59
See application file for complete search history.

(56) References Cited

U.S. PATENT DOCUMENTS

| | | | |
|---|---|---|---|
| 6,658,464 B2 * | 12/2003 | Reisman | 709/219 |
| 6,925,474 B2 | 8/2005 | McGrath et al. | 704/104.1 |
| 7,089,309 B2 | 8/2006 | Ramaley et al. | 709/226 |
| 2001/0034661 A1 | 10/2001 | Ferreira | 705/26 |
| 2002/0059611 A1 | 5/2002 | Stiliadis | 725/60 |
| 2002/0067371 A1 * | 6/2002 | Wu | 345/748 |
| 2002/0158916 A1 | 10/2002 | Gusler et al. | 345/850 |
| 2002/0165936 A1 * | 11/2002 | Alston et al. | 709/217 |
| 2003/0023514 A1 | 1/2003 | Adler et al. | 705/27 |
| 2003/0046150 A1 | 3/2003 | Ader et al. | 705/14 |
| 2003/0061114 A1 * | 3/2003 | Schwartz et al. | 705/26 |
| 2003/0231604 A1 | 12/2003 | Liu et al. | 370/313 |
| 2004/0015408 A1 | 1/2004 | Rauen, IV et al. | 705/26 |
| 2004/0015443 A1 * | 1/2004 | McCoy | 705/50 |
| 2004/0148366 A1 | 7/2004 | Ross, Jr. et al. | 709/218 |
| 2005/0050218 A1 | 3/2005 | Sheldon | 709/231 |
| 2005/0076132 A1 | 4/2005 | Roberts et al. | 709/228 |
| 2005/0216287 A1 | 9/2005 | Crosby et al. | 705/1 |

(Continued)

FOREIGN PATENT DOCUMENTS

EP    1564965    8/2005

OTHER PUBLICATIONS

U.S. Appl. No. 60/607,045. Edmonson et al. Sep. 3, 2004. pp. 54-67.*

(Continued)

*Primary Examiner*—Jeffrey A. Smith
*Assistant Examiner*—William J. Allen
(74) *Attorney, Agent, or Firm*—Fish & Richardson P.C.

(57) ABSTRACT

A method for implementing a media content store includes providing a set of exemplary storefronts for the media content store; receiving a designation of a selected storefront and media content in an origination format; transforming the media content into a distribution format; and offering the transformed media content to a prospective customer through the selected storefront.

3 Claims, 4 Drawing Sheets

U.S. PATENT DOCUMENTS

| | | | |
|---|---|---|---|
| 2005/0216289 A1 | 9/2005 | Parsons et al. | 705/1 |
| 2006/0010373 A1 | 1/2006 | Burns | 715/513 |
| 2006/0015649 A1 | 1/2006 | Zutaut et al. | 709/246 |
| 2006/0031147 A1* | 2/2006 | Bell et al. | 705/27 |
| 2006/0053079 A1* | 3/2006 | Edmonson et al. | 705/59 |
| 2006/0095835 A1 | 5/2006 | Kennedy et al. | 715/513 |
| 2006/0212472 A1 | 9/2006 | Fox et al. | 707/102 |
| 2007/0067714 A1* | 3/2007 | Lin | 715/513 |

OTHER PUBLICATIONS www.thinclient.net. Jan. 22, 2004. [Accessed via www.archive.org on Feb. 26, 2008].*

Server-Based and Thin Client Computing: Promise and Practicalities. QNB Intelligence Executive Summary. Oct. 2003. [Accessed via www.thinclient.com on Feb. 26, 2008].*

* cited by examiner

SYSTEM, METHOD, AND COMPUTER READABLE MEDIUM FOR IMPLEMENTING A MEDIA CONTENT STORE

RELATED APPLICATIONS

This application is a continuation (and claims the benefit of priority under 35 USC 120) of U.S. application Ser. No. 11/327,154, filed Jan. 6, 2006. The disclosure of the prior application is considered part of (and is incorporated by reference in) the disclosure of this application

FIELD OF INVENTION

The invention relates to content distribution, and in particular to the distribution of media content.

BACKGROUND

An entrepreneur who wishes to sell goods over the internet typically creates a web site, which functions as a virtual store. The web site displays or otherwise describes the goods on sale and provides controls for causing execution of certain software. These controls enable the virtual store to accept orders for goods, process payments, and receive instructions for delivery.

The fulfillment of such orders, however, involves more conventional methods for delivery. Software executing in connection with the virtual store generally sends a message that ultimately causes the selected goods to be physically transported to their destination. This greatly simplifies the tasks inherent in creating a virtual store for sale and/or distribution of goods over the internet.

For those who wish to sell content, the internet provides a way to deliver the actual content. Virtual stores for content distribution typically maintain collections of computer-readable files containing data representing content. Using the internet, the virtual store either downloads or streams this data to a client. This fulfillment method is particularly useful for distributing media content, such as audio and/or video, text, or other multimedia presentations.

The construction of a virtual store for facilitating the sale and/or distribution of media content is made far more difficult by the need to provide software for processing the media content, delivering it on demand, playing selected portions of the content upon request, and enforcing intellectual property rights in the content. Virtual stores for content distribution are often expected to cope with efficiently delivering content to a great many clients who collectively use a variety of internet protocols, including, but not limited to, http, ftp, and mms. Individual creators of media content often lack the technical skills for creating such a virtual store, or the resources to hire someone to create such a store on their behalf.

As a practical matter, the difficulties inherent in creating a virtual store for distribution of media content all but force the creator of such content to seek assistance from an established distributor. However, established distributors are often wary of committing their marketing and distribution resources on behalf of unknown talent. Moreover, even when persuaded to lend their assistance, there is a price exacted by such a distributor, both in terms of revenue sharing and in the loss of control over the marketing and distribution of content.

SUMMARY

The invention provides a method and system for enabling a creator of media content to easily become a media entrepreneur by setting up and operating a virtual store for distribution and/or sale of media content.

In one aspect, the invention features a method for implementing a media content store. Such a method includes providing a set of exemplary storefronts for the media content store, each of the storefronts providing a publicly accessible user interface; receiving a designation of a selected storefront; receiving media content in an origination format; transforming the media content into a distribution format; and offering the transformed media content to a prospective customer through the selected storefront.

Alternative practices include those in which offering the transformed media content to a prospective customer through the selected storefront includes offering the transformed media content for distribution, and those in which offering the transformed media content to a prospective customer through the selected storefront includes offering the transformed media content for sale.

In certain practices, offering the transformed media content to a prospective customer through the selected storefront includes offering the transformed media content for playback.

Other practices further include receiving data for populating the media content store. In such cases, this can include receiving media content, or data representative of promotional materials.

Other practices include those that further include receiving instructions for restricting distribution of media content. Exemplary instructions include those restricting geographic distribution of the media content.

In some practices, offering the transformed media content to a prospective customer includes establishing communication with a digital processing device associated with the customer. Exemplary digital processing devices include media players and general purpose digital computers.

Alternative practices of the inventor include those in which transforming the media content into a distribution format includes extracting a portion of the media content for playback.

Many different types of media content can be received. Thus, various practices include those in which receiving media content includes receiving data representative of audio information, receiving data representative of video information, and receiving data representative of textual information.

Some practices include accepting instructions from the prospective customer for consummating distribution of the media content.

Other practices include those that in response to accepting instructions, cause distribution of meta-data associated with the media content file.

Yet other practices include those that in response to accepting instructions, rename a media content file. Among these practices are those in which renaming includes replacing an assigned name with a received name.

Additional practices include providing a download utility for causing download of the media content to a digital appliance provided by the prospective customer, as well as those that include providing a link that, when accessed, enables distribution of the media content to a digital appliance provided by the prospective customer.

In some other practices, accepting instructions includes receiving data representative of instructions for authorizing distribution of the media content.

Additional practices also include receiving instructions authorizing modification of data representative of a first account and corresponding modification of data representative of a second account, the first account being associated with the prospective customer and the second account being associated with the media content store.

In another aspect, the invention features a system for implementing a media content store. Such a system includes a sign-up/administration module for receiving a choice for a designated storefront selected from a set of exemplary storefronts for the media content store; a media content transformer, in data communication with the sign-up/administration module, for transforming media content from an origination format into a distribution format; and a storefront process for providing a prospective customer with access to the media content through the selected storefront.

Embodiments include those in which the storefront process is configured for media content distribution, those in which the storefront process is configured for sale of media content, and those in which the storefront process is configured for playback of media content.

Other embodiments include those in which the sign-up/administration module is configured to receive data for populating the media content store, those in which the sign-up/administration module is configured to receive media content, and those in which the sign-up/administration module is configured to receive data representative of promotional materials, for example coupons.

Yet other embodiments include those in which the sign-up/administration module is configured to receive instructions for restricting distribution of the media content. A variety of ways exist to restrict distribution. For example, in some embodiments the sign-up/administration module is configured to receive instructions for restricting geographic distribution of the media content.

Embodiments also include those in which the storefront process is configured to establish communication with a digital processing device associated with the customer, for example with a media player, or with a general purpose digital computer.

Additional embodiments include those in which the media content transformer is configured to extract a portion of the media content for playback, and those in which the media content transformer is configured to transform data representative of audio information, video information, textual information, and/or any combination thereof.

In other embodiments, the sign-up/administration module is configured to receive executable files.

In yet other embodiments, the storefront process is configured to accept instructions for consummating distribution of the media content. Among there are embodiments in which the storefront process is configured to receive data representative of instructions for authorizing distribution of the media content, and those in which the storefront process is configured to receive instructions authorizing modification of data representative of a first account and corresponding modification of data representative of a second account, the first account being associated with the prospective customer and the second account being associated with the media content store.

Other embodiments include a download process configured to distribute meta-data associated with the media content file. In some of these embodiments the download process is configured to provide a download utility for downloading the media content. In others, the download process is configured to provide a hyperlink for accessing the media content.

Certain embodiments include a download process configured to rename a media content file. Among these are embodiments in which the download process is configured to replace an assigned name with a received name.

In another aspect, the invention includes a computer-readable medium having stored thereon software for establishing a media content store. The software including instructions that, when executed by a processor, cause the processor to provide a set of exemplary storefronts for the media content store, each of the storefronts providing a publicly accessible user interface; receive a designation of a selected storefront; receive media content in an origination format; transform the media content into a distribution format; and offer the transformed media content to a prospective customer through the selected storefront.

As used in the foregoing, alternative "embodiments" of methods are referred to as "practices" because a method, by its nature, lacks a corporeal essence.

Unless otherwise defined, all technical and scientific terms used herein have the same meaning as commonly understood by one of ordinary skill in the art to which this invention belongs. Although methods and devices similar or equivalent to those described herein can be used in the practice or testing of the present invention, suitable methods and devices are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

Other features and advantages of the invention will be apparent from the following detailed description, and from the claims.

DETAILED DESCRIPTION

The detailed description that follows describes but one of many embodiments of the invention. It is therefore intended to be illustrative of the invention and not to be limiting in any way. The following description is thus an aid in determining the scope of the invention. It is not definitive of that scope. The limits of the invention are defined only by the appended claims.

As used herein, terms such as "computer system," "data processing system," and "computer" refers to a physical machine having one or more processing elements and one or more storage elements in communication with the one or more of the processing elements. The term "process" refers to software that is being run on a computer system. Generally, a process comes into existence, or is spawned by the execution of code stored on computer-readable media and ceases to exist upon termination of execution.

Figure 1:
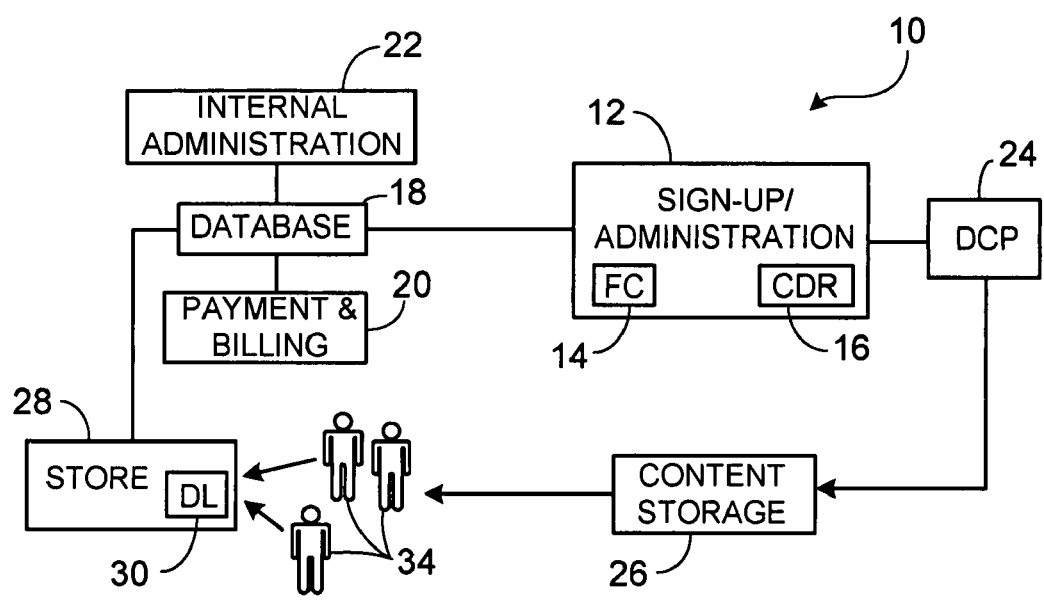
FIG. 1 shows a media content distribution system having a pre-fabricated storefront.

Referring to FIG. 1, a particular implementation of a media content distribution system 10 features a sign-up/administration process 12 for interacting with prospective media entrepreneurs. The sign-up/administration process 12 accepts, from a prospective media entrepreneur, information identifying the entrepreneur, and information enabling the entrepreneur to collect payment. The signup/administration process 12 also solicits the entrepreneur's agreement to terms for accessing and using the distribution system 10.

After accepting the terms, the entrepreneur becomes a proprietor of a virtual media store. The sign-up/administration process 12 then provides the newly-minted proprietor with a series of pre-fabricated storefronts for defining the look and feel of the newly-established virtual media store. In response to instructions by the proprietor, the sign-up/administrative process 12 displays a preview of how the storefront might appear upon selection of a particular pre-fabricated storefront. After receiving the proprietor's selection of a pre-fabricated storefront, the sign-up/administration process 12 invites the proprietor to populate the storefront with media content and with any text or images intended to promote distribution of such media content. In addition, the sign-up/administration process 12 offers the proprietor the opportunity to restrict or otherwise control distribution of media content, for example by specifying how intellectual property rights in the media content are to be enforced.

As used herein, the term "proprietor" is not intended to refer to a specific person. For example, the term "proprietor" may include one acting on behalf of the proprietor, for example as an agent. In some cases, the proprietor may be a corporate entity or another type of business organization. The term "proprietor" is intended primarily to distinguish between those who provide media content, and those who consume it.

Similarly, as used herein, the term "customer" is not intended to mean a specific person, but can represent an agent acting on behalf of a specific person or an entity. Since the playback unit or digital processing device that interacts with the media content distribution system 10 acts on behalf of a specific person or entity, that device will sometimes be referred to as a "customer."

During the course of operating the media store, the proprietor is free to further interact with the sign-up/administration process 12 to manage the media store. Typical management tasks that a proprietor might carry out include providing additional media content for distribution, editing any of the promotional materials, changing personal information or account information, changing the way intellectual property rights are enforced, or even changing the look and feel for the virtual store.

In connection with accepting media content, the sign-up/administration process 12 executes a file-check utility 14 for rapidly scanning files prior to acceptance. The file check utility 14 determines whether files are ready to be accepted for upload. The sign-up/administration process 12 also provides the proprietor with an opportunity to add or change meta-data, i.e., data about the media content.

The sign-up/administration process 12 also executes a CD ripping process 16 for reading data formatted for storage on an audio CD and transforming it into data formatted for uploading into the media content distribution system 10.

The sign-up/administration process 12 thus enables the proprietor to, in effect, create a virtual store "on the fly," or interactively. For example, the sign-up/administration process 12 provides a menu of templates for enabling a proprietor to instantly modify or restyle the look and feel of the media store. In addition, the sign-up/administration process 12 provides a menu of options for digital rights management to be applied to any media content offered for distribution.

When the proprietor selects a particular look and feel, the sign-up/administration process 12 causes a style file to be associated with the proprietor's store, the style file is stored, together with other style files, in a known location. Each style file points to a folder that contains images to be used with a particular file. These images include pre-defined images, as well as optional images that are solicited from the proprietor.

Data collected by the sign-up/administration process 12 is saved in a central database 18 for access by other components of the distribution system 10.

As part of its role in setting up the store, the sign-up/administration process 12 can also associate, with media content, data indicative of digital rights in that media content. Such digital rights can include data indicative of restrictions on distribution of content. Exemplary restrictions include restrictions on the number of times media content can be copied or otherwise re-distributed, the number of times media content can be played, or the extent to which media content can be geographically distributed. For example, the sign-up/administration process 12 can associate data that specifies what countries media content may be distributed to. Information on what restrictions are to apply to particular media content, or to media content globally, can be stored, for example, in the central database 18.

The media content distribution system 10 also features a payment-and-billing process 20 in communication with the central database 18. The payment-and-billing process 20 handles the details of all transactions, such as posting debits to accounts of customers 34 who purchase media content, remitting revenue derived from such sales to the proprietor, and remitting revenue or other service charges to the operator of the distribution system 10. It does so in part by reading data from the central database 18 to obtain customer account information and updating the central database 18 upon completion of any transactions.

The media content distribution system 10 further features an internal-administration process 22 for handling administration of all stores associated with all proprietors served by the system. The internal-administration process 22 is controlled by the operator of the media content distribution system 10 rather than the individual proprietors. Among its functions are the management and monitoring of all activity on the distribution system 10, as well as the policing of proprietors who violate any terms of the subscription agreement.

A content formatting process 24 in data communication with both the central database 18 and the sign-up/administration process 12 receives media content from the sign-up/administration process 12 and information about that media content from the central database 18. The content formatting process 24 transforms media content provided by the proprietor from an origination format into any of a variety of distribution formats suitable for distribution over the internet and playback on a customer's playback unit. As part of its function, the content formatting process 24 writes information about the status of processing the media content. The content formatting process 24 saves the transformed media content to a content storage area 26 where it awaits distribution.

The content formatting process 24 transforms uploaded media content into one or more formats suitable for distribution. Exemplary distribution formats include, but are not limited to WMA format and MP3 format. However, the content formatting process 24 can translate one format into any other format within the same media category. Exemplary media categories include audio and video.

In addition, the content formatting process 24 may extract selected portions of the uploaded content to create a ring-tone suitable for download to a cell phone or personal digital assistant, or other selected portions suitable for preview by customers. The process of extracting selected portions need not happen immediately. For example, a proprietor could choose to extract selected portions of previously uploaded media content.

By pre-processing the media content in this way, the media content distribution system 10 avoids the need to carry out the processing in real-time. In addition, the media content distribution system 10 avoids the inefficiency of carrying out the same processing multiple times.

The content formatting process 24 is preferably in local data communication with the content storage area 26 and with the sign-up/administration process 12. All storage carried out by the content formatting process 24 is carried out locally. As used herein, "local" means that data communication need not be carried out over a network, with its overhead of network protocols. This allows more rapid processing.

The most readily apparent component of the distribution system 10, from the point of view of the customer 34, is the storefront process 28. The storefront process 28 creates a storefront that invites customers 34 to interact with the proprietor, for example, by inviting the transmission of a text message, to browse media content for distribution, and to actually receive the media content, or other goods, either through purchase, by redemption of coupons, or simply upon request, depending on the restrictions imposed by the proprietor.

Data representative of coupons, such as stored value codes, suitable for redemption by the storefront process 28 can be obtained in numerous ways. The proprietor may, for example, using the sign-up/administration process 12, configure special offers and create coupon codes. These coupon codes can then be transmitted to customers 34 whose contact information is stored in the central database 18. A customer 34 who receives a coupon code can then interact with the storefront process 28. The storefront process 28 typically asks the customer 34 to enter the coupon code, confirms that the coupon code is valid, and proceeds to download the requested content to a location designated by the customer 34.

The storefront process 28 obtains, from the central database 18, information concerning the appearance of the storefront and the media content available for distribution. The storefront process 28 also updates to the central database 18 with information about new customers 34 and any new transactions carried out with new or existing customers 34. To facilitate download, the store 28 provides the customer 34 with a download utility, or a hyperlink to obtain the download utility. The download utility 30 is a small executable file that is downloaded by the customer 34. The download utility 30 carries out the download of media content from the content storage area 26 and immediately post-processes that media content to append associated metadata.

Among the tasks of the download utility 30 is that of configuring the download from a media content delivery system 10, and downloading the file using any one of a variety of internet protocols, including, but not limited to http and ftp. Optionally, the download utility 30 renames the file to a name that is more readily associated with the content. Such a file name is typically specified by the proprietor. Finally, the download utility 30 associates, with the downloaded media content file, meta-data as specified by the proprietor.

In an alternative embodiment, a download is consummated without a download utility 30 by providing links that enable a customer's browser to carry out the download. In such cases, the tasks of associating meta-data with the media content file and that of renaming the file cannot be carried out by the download utility 30. In such cases, these tasks can be carried out by a server on a content delivery network through which the media content is to be downloaded.

As used herein, the term "customer" is not intended to imply that an actual purchase must be made. The proprietor of a virtual store has complete freedom in managing intellectual property rights associated with media content. Thus, the proprietor may choose to simply give away media content in an unrestricted way, either to all or to selected customers 34. Such generosity may be motivated, for example, by an interest in promotion.

A customer typically interacts with the storefront using a general purpose digital computer. However, the media content distribution system 10 described herein is not limited by the customer's choice of device. The media content distribution system 10 described herein can readily be configured to accommodate any of a variety of digital processing devices, including music players, video players, cellular telephones, or other digital appliances.

Moreover, there is no requirement that the proprietor actually offer any media content for sale. The proprietor may, for example, have an interest in publicity, and may, in some cases, simply provide biographical information.

Figure 2:
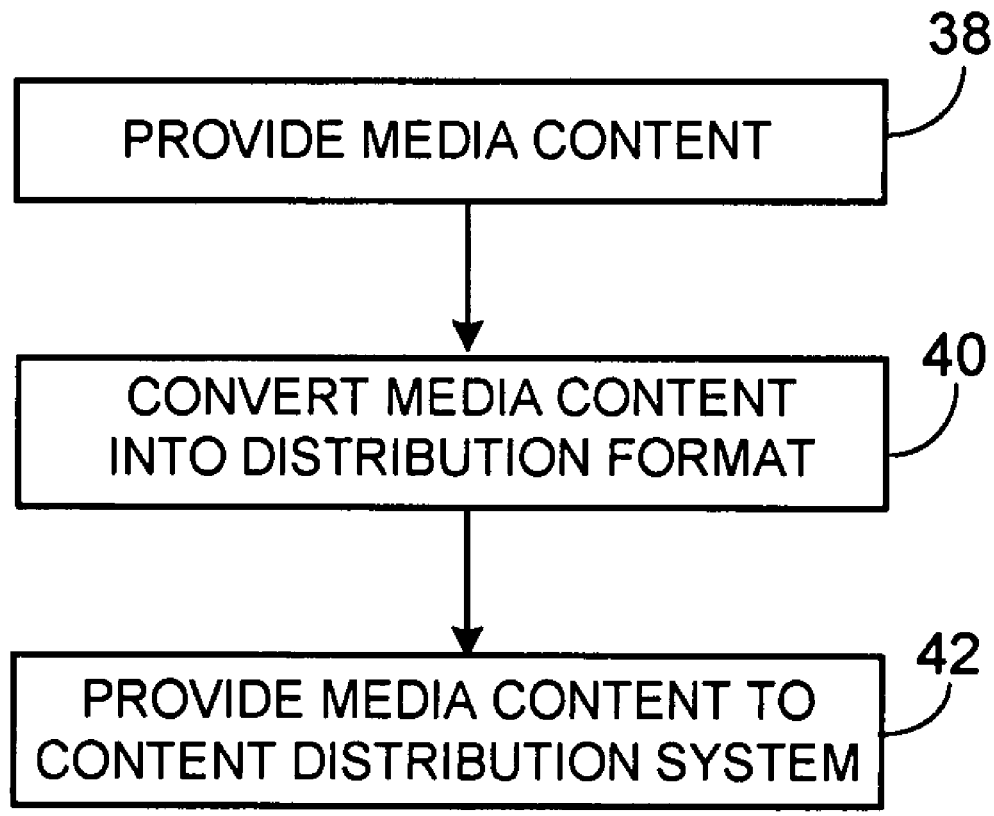
FIG. 2 is a flow-chart for a procedure carried out by a content-formatting process.

FIG. 2 shows, in more detail, the procedure carried out in preparing media content for distribution. First, the store proprietor provides the content formatting process 24 with access to the media content, for example by transmitting that content, stored in an origination format, over a network to a machine or cluster of machines (step 38) A machine or set of machines in cluster then launches a content formatting process 24 that converts the media content into a distribution format suitable for distribution (step 40). The media content, now stored in a distribution format, is then provided to a content distribution system, which places the media content, or pointers thereto, on one or more of its content servers for distribution (step 42).

Figure 3:
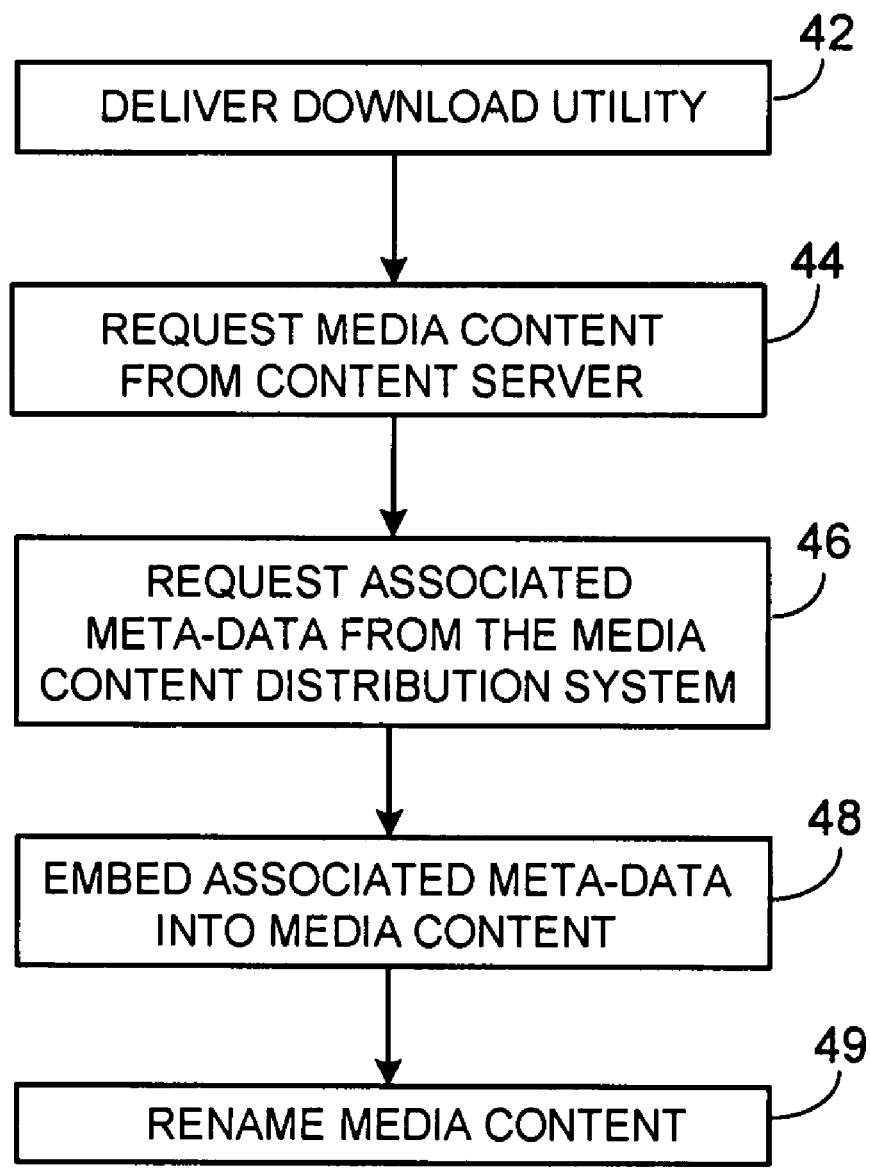
FIGS. 3 and 4 are flow-charts of alternative downloading procedures.
Figure 4:
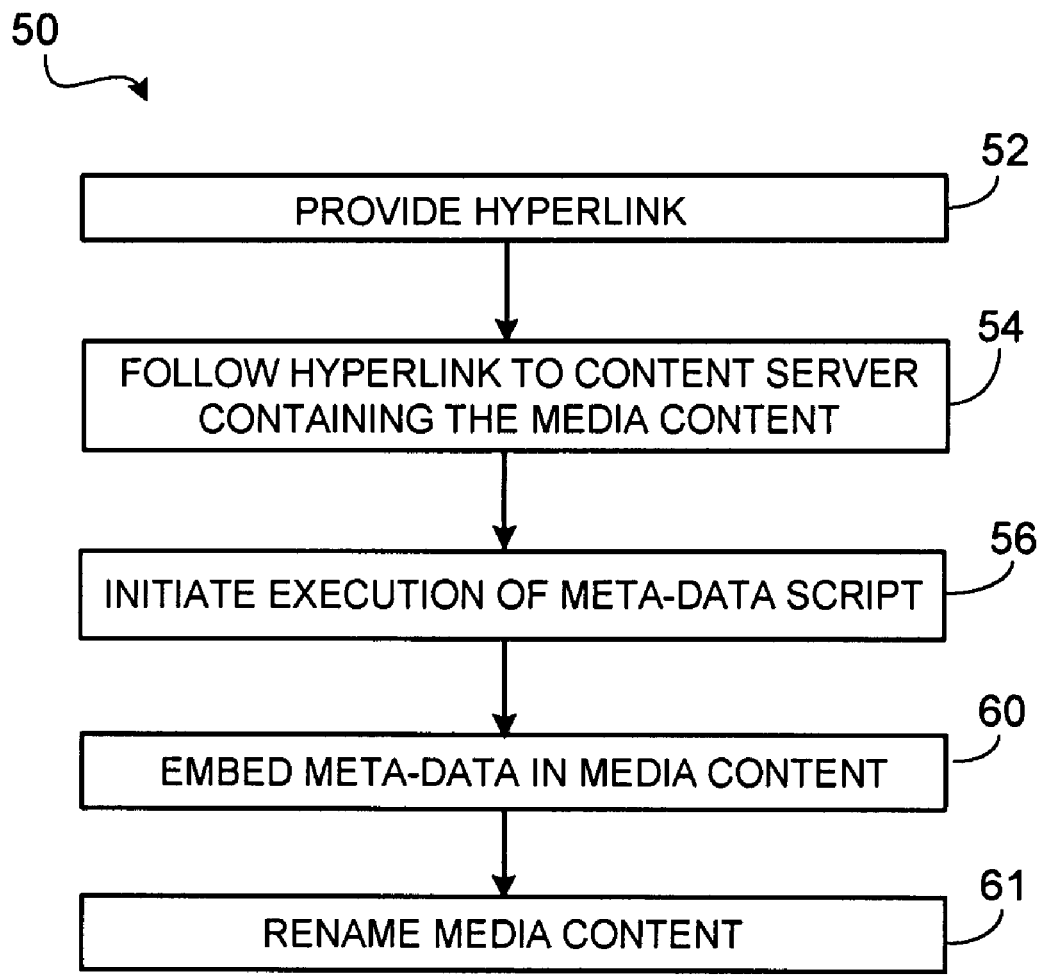

FIGS. 3 and 4 show the procedure carried out for downloading the media content, both with (FIG. 3) and without (FIG. 4) the operation of the download utility 30.

Referring first to FIG. 3, the download utility 30 is first delivered to a processing device associated with the customer (sep 42). The download utility 30 then requests the desired media content from a content server associated with the content delivery system (step 44) and also requests associated meta-data from the media content distribution system 10 (step 46). The download utility 30 then embeds the associated meta-data into the content file headers of the media content (step 48). Optionally, the download utility 30 renames the media content to a name previously specified by the proprietor (step 49).

In an alternative procedure 50 for downloading media content, shown in FIG. 4, a hyperlink is provided to the processing device associated with the customer (step 52).

Conventional browser software executing on the customer's processing device follows the hyperlink to a content server containing the media content (step 54). The hyperlink also initiates execution of a script by the content server (step 56). This script causes meta-data associated with the media content to be embedded in file headers of the media content (step 60). Optionally, the script causes the media content to be renamed as previously specified by the proprietor (step 61).

The foregoing description describes the logical architecture of the media content distribution system 10. The particular hardware components upon which the various processes described herein actually execute is immaterial to the invention. The various processes can execute on a single data processing system, or on multiple data processing systems in data communication with each other. Such data communication can be provided by a local area network, a wide area network, or combinations thereof.

A system as described herein can be implemented in hardware or software, or a combination of both. The system can be implemented in computer programs using standard programming techniques following the method steps and figures described herein. Suitable programs include those designed to execute on programmable computers and/or data processing systems, each comprising a processor, a data storage system (including memory and/or storage elements), at least one input device, and at least one output device, such as a CRT or printer. Program code is applied to input data to perform the functions described herein and generate output information. The output information is applied to one or more output devices such as a CRT, as described herein.

Each program is preferably implemented in a high level procedural or object oriented programming language to communicate with a computer system. However, the programs can be implemented in assembly or machine language, if desired. In any case, the language can be a compiled or interpreted language.

Each such computer program is preferably stored on a storage medium or device (e.g., ROM or magnetic diskette) readable by a general or special purpose programmable computer, for configuring and operating the computer when the storage media or device is read by the computer to perform the procedures described herein. The system can also be considered to be implemented as a computer-readable storage medium, configured with a computer program, where the storage medium so configured causes a computer to operate in a specific and predefined manner to perform the functions described herein.

Although the invention has been described above in the context of one embodiment, this is but one of many embodiments that incorporate the principles of the invention. The foregoing description as illustrating the invention and is therefore not to be construed as limiting the scope of the invention. Rather, the scope of the invention is to be determined by the appended claims.

What we claim as new, and secured by Letters Patent is:

1. A method for implementing a media content store, the method comprising:
    providing a set of exemplary storefronts for the media content store, each of the storefronts providing a user interface accessible to a prospective customer;
    receiving a designation of a selected storefront chosen from the set of exemplary storefronts;
    receiving media content in an origination format over a network;
    executing a file check utility by a sign-up/administration process to determine whether the media content is ready to be accepted for upload; and
    upon acceptance and upload of the media content, transforming the media content from the origination format into a distribution format;
    offering the media content, in the distribution format, to the prospective customer for download through the selected storefront;
    accepting instructions from the prospective customer for downloading the media content, in the distribution format, through the selected storefront; and
    providing a hyperlink for downloading the media content, in the distribution format, through the selected storefront to a digital appliance provided by the prospective customer.

2. A computer-readable medium having encoded thereon software for implementing a media content store, the software comprising instructions for:
    providing a set of exemplary storefronts for the media content store, each of the storefronts providing a user interface accessible to a prospective customer;
    receiving a designation of a selected storefront chosen from the set of exemplary storefronts;
    receiving, from the proprietor of the media content store, media content in an origination format over a network;
    executing a file check utility by a sign-up/administration process to determine whether the media content is ready to be accepted for upload; and
    upon acceptance and upload of the media content, transforming the media content from the origination format into a distribution format;
    offering the media content, in the distribution format, to the prospective customer for download through the selected storefront;
    accepting instructions from the prospective customer for downloading the media content, in the distribution format, through the selected storefront; and
    providing a hyperlink for downloading the media content, in the distribution format, through the selected storefront to a digital appliance provided by the prospective customer.

3. A system for implementing a media content store, the system comprising:
    a memory to store instructions;
    a data processor to execute the instruction to implement a sign-up/administration module for receiving a choice for a designated storefront selected from a set of exemplary storefronts for the media content store;
    a media content transformer, in data communication with the sign-up/administration module, for transforming media content received over a network from an origination format into a distribution format, wherein, the sign-up/administration process is configured to execute a file check utility to determine whether the media content is ready to be accepted for upload prior to transformation of the media content;
    a storefront process for offering the media content, in the distribution format, to the prospective customer for download through the selected storefront;
    wherein the storefront process is configured to accept instructions from the prospective customer for downloading one or more desired media content, in the distribution format, through the selected storefront;
    wherein the data processor further executes instructions to implement a download process configured to provide a hyperlink for downloading the desired media content, in the distribution format, through the selected storefront to a digital appliance provided by the prospective customer.

* * * * *

UNITED STATES PATENT AND TRADEMARK OFFICE
CERTIFICATE OF CORRECTION

PATENT NO. : 7,447,649 B2  Page 1 of 1
APPLICATION NO. : 11/777024
DATED : November 4, 2008
INVENTOR(S) : Vikramaditya Jain It is certified that error appears in the above-identified patent and that said Letters Patent is hereby corrected as shown below:

Col. 10, claim 3, line 34, replace "instruction" with "instructions".

Signed and Sealed this

Seventeenth Day of February, 2009

JOHN DOLL
*Acting Director of the United States Patent and Trademark Office*